US 11,858,481 B2

(12) United States Patent
Kimes

(10) Patent No.: US 11,858,481 B2
(45) Date of Patent: Jan. 2, 2024

(54) ROTATIONAL LOCK MODULE ASSEMBLY

(71) Applicant: Sigma Powertrain, Inc., Livonia, MI (US)

(72) Inventor: John W. Kimes, Wayne, MI (US)

(73) Assignee: Sigma Powertrain, Inc., Livonia, MI (US)

(*) Notice: Subject to any disclaimer, the term of this patent is extended or adjusted under 35 U.S.C. 154(b) by 0 days.

(21) Appl. No.: 17/551,241

(22) Filed: Dec. 15, 2021

(65) Prior Publication Data
US 2023/0182691 A1 Jun. 15, 2023

(51) Int. Cl.
*F16D 63/00* (2006.01)
*F16D 66/00* (2006.01)
*B60T 1/00* (2006.01)
*B60T 17/22* (2006.01)

(52) U.S. Cl.
CPC .............. *B60T 1/005* (2013.01); *B60T 17/22* (2013.01); *F16D 63/006* (2013.01); *B60T 2201/06* (2013.01); *B60T 2240/00* (2013.01); *F16D 2066/003* (2013.01)

(58) Field of Classification Search
CPC .. F16D 63/006; F16D 2066/003; F16D 41/12; F16D 41/04; F16D 2065/1384; B60T 1/005; B60T 2201/06
See application file for complete search history.

(56) References Cited

U.S. PATENT DOCUMENTS

| | | | | |
|---|---|---|---|---|
| 4,867,291 | A * | 9/1989 | Holman | B60K 17/26 74/335 |
| 6,290,044 | B1 * | 9/2001 | Burgman | F16D 41/125 192/85.48 |
| 2003/0121153 | A1 * | 7/2003 | Tajima | F16D 65/12 29/898.062 |
| 2006/0185957 | A1 * | 8/2006 | Kimes | F16D 41/12 192/48.601 |
| 2008/0185253 | A1 * | 8/2008 | Kimes | F16D 41/12 192/46 |
| 2016/0201739 | A1 * | 7/2016 | Kimes | F16D 27/108 192/84.92 |
| 2016/0265602 | A1 * | 9/2016 | Pritchard | F16D 27/118 |
| 2019/0226534 | A1 * | 7/2019 | Cioc | F16D 41/12 |
| 2019/0264760 | A1 * | 8/2019 | Peglowski | F16D 41/08 |
| 2020/0216056 | A1 * | 7/2020 | Sevel | B60W 30/18109 |
| 2021/0102586 | A1 * | 4/2021 | Hodge | F16D 41/16 |
| 2023/0009340 | A1 * | 1/2023 | Voelker | F16D 41/084 |

* cited by examiner

*Primary Examiner* — Timothy Hannon
*Assistant Examiner* — Farhana Pervin
(74) *Attorney, Agent, or Firm* — Simonelli IP, PLLC

(57) ABSTRACT

A lock module assembly controls hill hold, park, and neutral states of a vehicle. The lock module assembly does all of this by controlling rotation of a wheel hub (or a shaft that rotates the wheel hub) of the vehicle. The lock module assembly includes a pocket plate fixedly secured to a rotating shaft. The pocket plate includes a locking element housed therein. A notch plate has first and second sets of notches with the first set complementing the pocket plate secured to the rotating shaft. A second set of notches complements a static pocket plate that houses at least clockwise actuator and at least one counterclockwise actuator. The actuators are used to control hill holds and park, whereas the locking element of the pocket plate disengages the wheel hub from the rotating shaft (neutral).

23 Claims, 4 Drawing Sheets

ROTATIONAL LOCK MODULE ASSEMBLY

BACKGROUND ART

1. Field of the Invention

The invention relates to controlling the rotation of a vehicular wheel. More particularly, the invention relates to a control module used to control the rotation of the vehicular wheel during park, hill hold in both directions, and to disengage the vehicular wheel allowing it to exist in a neutral condition.

2. Description of the Related Art

All electric, hybrid electric, and plug-in hybrid electric vehicles (collectively referred to as EVs) have a powertrain to transfer power from various power generators to the driven wheels of the vehicle. Controlling the driven wheels during non-driven situations is required to have complete control of the vehicle. Non-driven situations include when the vehicle is parked, when the vehicle is being held in place while the orientation of the vehicle includes a non-zero vertical component (stopped on an incline, e.g., a hill), and when it is desired to not have the wheel be connected (a non-driven state) such as when the vehicle is in neutral. Similar to the neutral condition, driven wheels may at times be disconnected from the torque being generated by the motive force generator of the vehicle. This will be considered a subset of the neutral condition.

Systems have been developed to control these situations. These systems are, however, extraneous resulting in added costs in part inventory, manufacture, and design. There is a need for a modular system that minimizes weight and manufacturing costs.

SUMMARY OF THE INVENTION

A lock module assembly controls rotation of a wheel hub of a vehicle having a vehicle frame and a rotating shaft to rotate the wheel hub. The lock module assembly includes a disconnect race that is fixedly secured to the rotating shaft. The disconnect race extends out to a disconnect periphery. At least one locking element is housed within the disconnect race. A control race has a first set of locking teeth selectively engageable with the at least one locking element of the disconnect race. The control race rotates with the disconnect race when the at least one locking element engages the first set of locking teeth. The control race has a second set of locking teeth in spaced relation to the first set of locking teeth. At least one clockwise actuator operatively engages the second set of teeth on the control race preventing movement of the control race in a counterclockwise direction. Likewise, at least one counterclockwise actuator operatively engages the second of teeth on the control race preventing movement of the control race in a clockwise direction.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
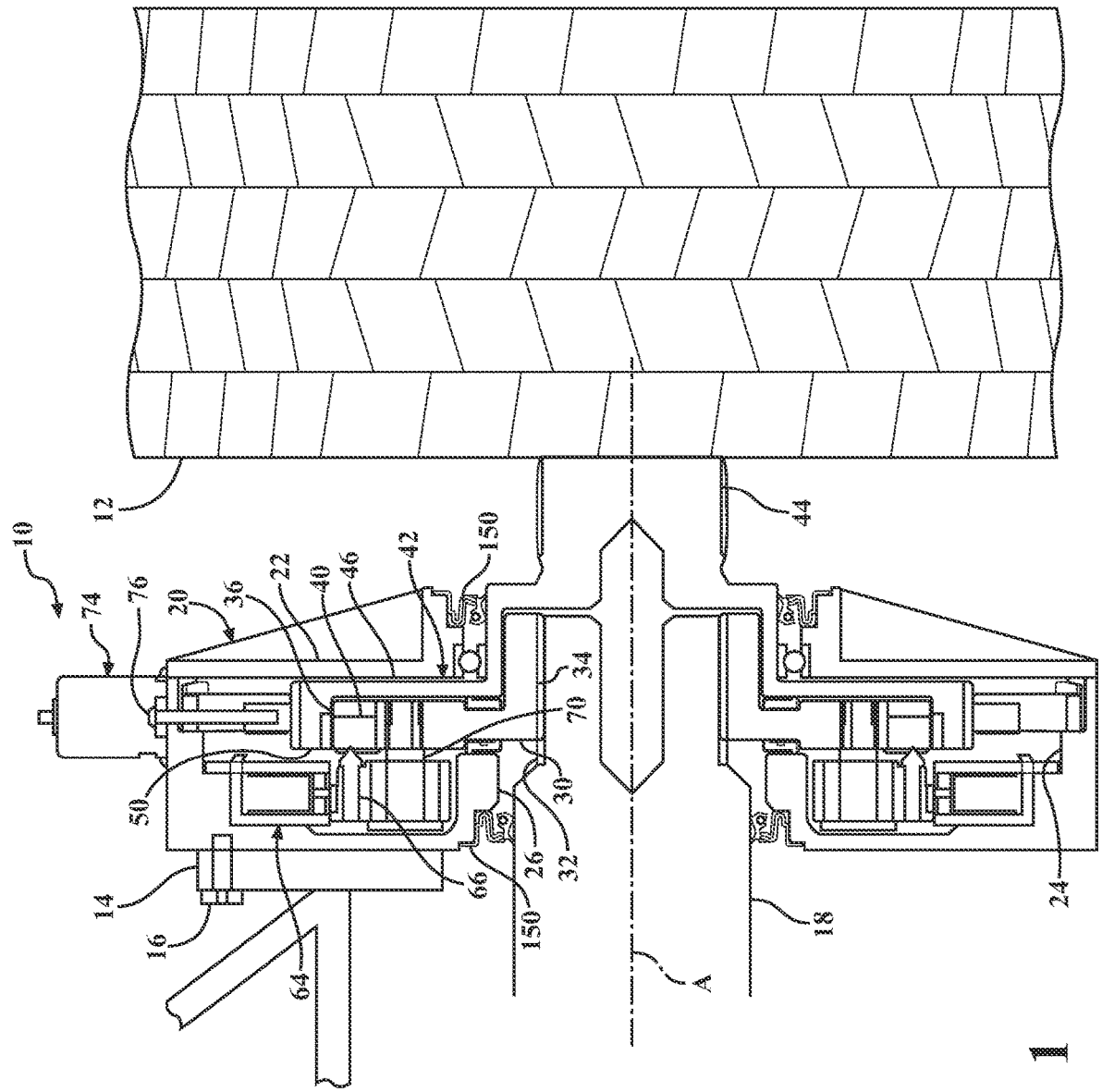
FIG. 1 is a cross-sectional side view of one embodiment of lock module assembly secured to a vehicle frame, partially shown, and a vehicle wheel, represented by a vehicle tire, partially shown.

Referring to the Figures, one embodiment of a lock module assembly is generally indicated at 10. The lock module assembly 10 locks a wheel hub, graphically represented by a tire 12, shown partially cut away in FIG. 1. A shaft or some other structure may be required between the lock module assembly 10 and the wheel hub 12, depending on the design of the vehicle in which the lock module assembly 10 is to be installed. It should be appreciated by those skilled in the art that such a design falls within the scope of this disclosure.

The lock module assembly 10 selectively inhibits the rotation of the wheel hub 12 in one direction, the other direction, in both directions, and in neither direction. The first two of these situations wherein the wheel hub 12 is locked from rotating in one or the other directions are commonly referred to as "hill hold." The third situation with the wheel hub 12 locked in both directions is commonly referred to as "park," whereas the fourth situation with neither direction of the wheel hub 12 rotation locked being commonly referred to as "neutral" or "disconnect." The reason there are two hill hold locking conditions is due to the orientation of the vehicle on the hill in combination with the direction the vehicle is directed to move. For example, if a front of a vehicle is extending down an incline and the driver of the vehicle directs the vehicle to move in reverse direction (back up), the lock module assembly will prevent the vehicle from rolling in a forward direction down the incline. It should be appreciated by those skilled in the art that the hill hold function must operate in both directions, depending on the desired driving direction from that position to prevent the vehicle from rolling down the incline when it is desired to travel up the incline.

The lock module assembly 10 is also fixedly secured to a non-rotating portion of the vehicle 14 (graphically represented by the vehicle frame 14). In the embodiment shown in FIGS. 1 through 3, the non-rotating portion of the vehicle is the vehicle frame 14. The lock module assembly 10 is shown to be fixedly secured to the vehicle frame 14 by a set of bolts 16 (one shown). The lock module assembly 10 may be secured to another vehicular structure so long as the lock module assembly 10 does not rotate relative to the vehicle 14. It should be appreciated by those skilled in the art that the lock module assembly 10 may be secured to other structures similar to the vehicle frame 14 with devices similar to bolts 16 without changing the scope of this disclosure. A rotating shaft 18 is operatively connected to the wheel hub 12 such that the rotating shaft 18 selectively provides torque that will eventually drive the wheel hub 12. The rotating shaft 18 is driven by a motor or an engine, either directly or indirectly through a transmission (neither shown). The connection between the rotating shaft 18 and the wheel hub 12 will be discussed in greater detail subsequently.

The lock module assembly 10 includes a case, generally shown at 20, defining an exterior 22, an interior 24, a central axis A, and a through port 26. The through port 26 is coaxial with the central axis A. It is the exterior 22 of the case 20 that is fixedly secured to the vehicle frame 14 such that there is no lost motion between the case 20 and the vehicle frame 14. The case 20 is fixedly secured to the vehicle frame 14 in a position and orientation such that the rotating shaft 18 is coaxial with the central axis A.

The lock module assembly 10 includes a disconnect race 30. The disconnect race 30 is fixedly secured to the rotating shaft 18 by any means known in the art such that there is no lost motion or slippage between the rotating shaft 18 and the disconnect race 30. In one embodiment, a spline 32, 34 is used to prevent lost motion between the rotating shaft 18 and the disconnect race 30. The disconnect race 30 extending out to a disconnect periphery 36 and defines a disconnect race radius B. At least one disconnect locking element 40 is housed within the disconnect race 30. In the embodiment shown in the Figures, the disconnect race 30 is a pocket plate 30 and the at least one disconnect locking element 40 is a disconnect rocker 40. It should be appreciated by those skilled in the art that the disconnect race 30 may facilitate any style of clutch assembly, including but not limited to mechanical clutches, friction clutches, dog clutches, planar clutches, radial clutches, controllable or otherwise.

The lock module assembly 10 also includes a control race, generally shown at 42. In the embodiment shown, the control race 42 is a notch plate disposed adjacent the disconnect race 30 and includes a control hub 44, a control body 46 and a control rim 50. All three control parts 44, 46, 50 are coaxial with each other and the central axis A. In the embodiment shown in the Figures, the control hub 44 defines a control hub radius C and the control rim 50 defines a control rim radius D, wherein the control rim radius D is greater than the control hub radius C. The control rim 50 defines a control outer edge 52 and a control inner edge 54. The control inner edge 54 is disposed adjacent the disconnect periphery 36 of the disconnect race 30 such that the control rim 50 extends out from the control body 46 allowing the control rim 50 to cover the disconnect race 30. The control rim 50 generally extends out perpendicularly to the control body 46. In other words, the disconnect race 30 may be considered to fit within the control race 42. In the embodiment shown, the control hub 44 extends out from the control body 46 in a direction opposite the direction in which the control rim 50 extends out from the control body 46.

The control race 42 includes at least one disconnect tooth 56 position on the control inner edge 54. In the embodiment shown, the control race 42 includes a set of disconnect teeth 56 extending equidistantly about the control inner edge 54 directed inwardly toward the central axis A. The set of disconnect teeth 56 may be selectively engageable with the at least one disconnect locking element 40 of the disconnect race 30, wherein the control race 42 rotates with the disconnect race 30 when the at least one disconnect locking element 40 engages at least one of the set of disconnect teeth 56. Because the disconnect race 30 is splined or otherwise fixedly secured to the driven shaft 18, the control race 42 rotates with the driven shaft 18 when the at least one disconnect locking element 40 engages at least one of the set of disconnect teeth 56 on the disconnect race 30. When the at least one disconnect locking element 40 no longer engages the disconnect teeth 56, the control race 42 and, hence, the wheel hub 12 will be disconnected from the driven shaft 18. Without any other controls on the wheel hub 12, the wheel hub 12 will be in "neutral" and can roll independently of any rotation of the driven shaft 18 when the control race 42 is disconnected from the driven shaft 18 by the disconnect race 30.

The control race 42 also includes at least one control tooth 60. The at least one control tooth 60 is spaced from the set of disconnect teeth 56. In the embodiment shown in the Figures, the control race 42 includes a set of control teeth 60 spaced equidistantly about the control outer edge 52 of the control race 42 extending outwardly away from the central axis A. Both the at least one disconnect tooth 56 and the at least one control tooth 60 are designed to be bidirectional such that they are operational regardless of the direction of rotation of the driven shaft 18 or the rotational movement of the wheel hub 12.

The lock module assembly 10 includes a disconnect actuator 64 that operatively engages the at least one locking element 40 to selectively connect and disconnect the control race 42 to and from the disconnect race 30, respectively. The disconnect actuator 64 operatively moves a plunger 66 into and out of engagement with the locking element 40. One embodiment of the disconnect actuator 64 is a linear actuator described in U.S. Pat. No. 11,139,097, assigned to the applicant of this invention, the disclosure of which is hereby incorporated by reference. It should be appreciated by those skilled in the art that other actuators may be used to move the locking element 40.

Figure 2:
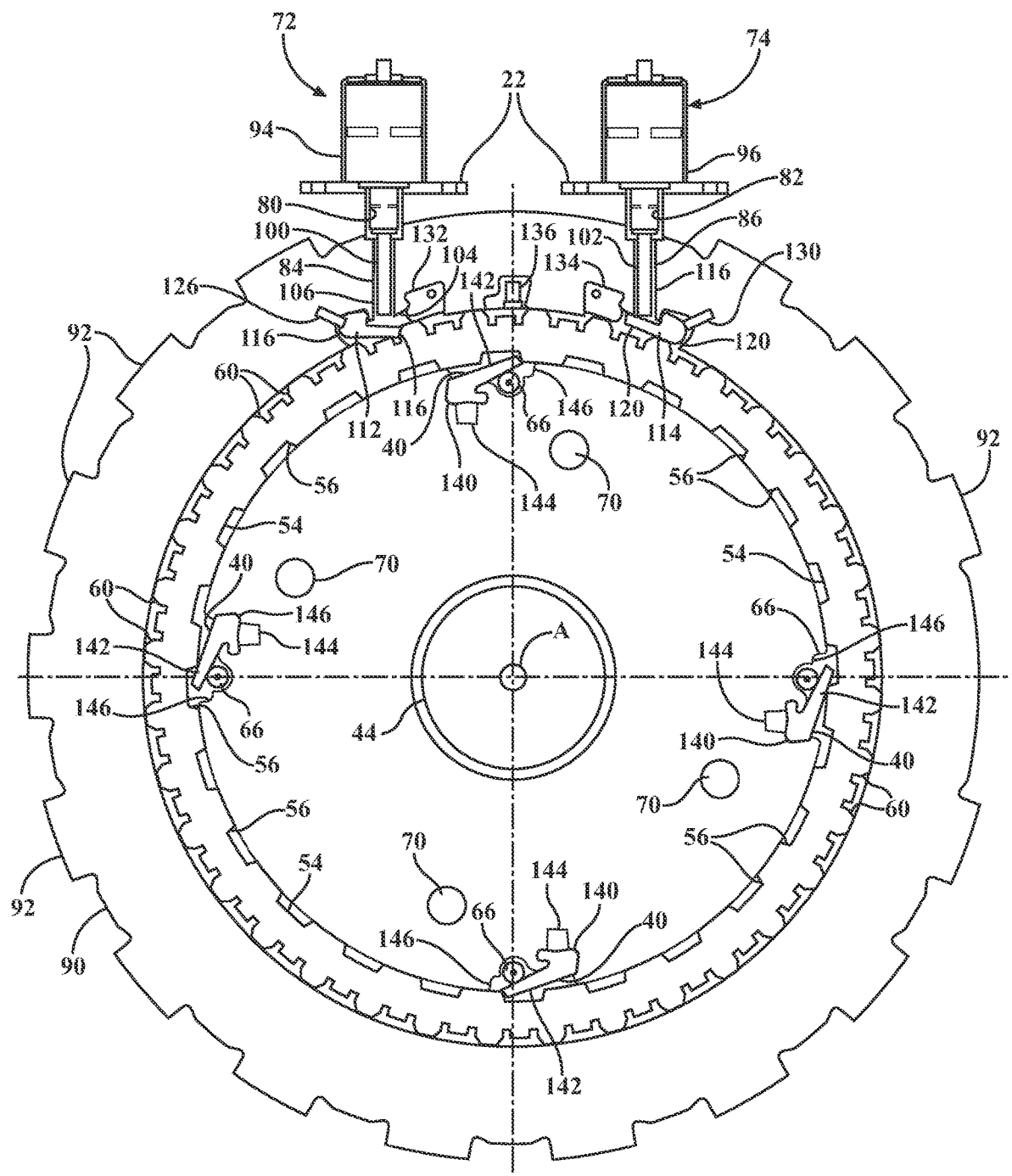
FIG. 2 is a cross-sectional view taken along lines 2-2 of FIG. 1.

The disconnect actuator 64 rotates with the disconnect race 30. At least one pin 70 aligns the disconnect actuator 64 with the disconnect race 30 so that the plunger 66 always is able to engage or disengage the at least one locking element 40. It should be appreciated by those skilled in the art that the lock module assembly 10 may include a number of pins 70 spaced about the lock module assembly 10. As shown in FIG. 2, there are four pins 70, all equidistant from the central axis A at a radius less than the disconnect race radius B, but greater than the control hub radius C.

The lock module assembly 10 includes at least one clockwise control actuator, generally shown at 72, for operatively engaging the set of control teeth 60 on the control outer edge 52 of the control rim 50 of the control race 42 to prevent movement of the control race 42 in a counterclockwise direction (directions are with reference to the orientation of the lock module assembly 10 in FIG. 2). The lock module assembly 10 also includes at least one counterclockwise control actuator, generally shown at 74, for operatively engaging the set of control teeth 60 to prevent movement of the control race 42 in a clockwise direction. While there are only two of these actuators 72, 74 shown, it should be appreciated by those skilled in the art that there may be a plurality of these actuators 72, 74 positioned about the control outer edge 52.

Each of the control actuators 72, 74 is secured to the case exterior 22 using fasteners, such as bolts 76 (one shown in FIG. 1). Actuator channels 80, 82 extend through the case 20 providing access to the case interior 24 for each of the control actuators 72, 74. Plunger channels 84, 86 provide access to the control race 42 and the set of control teeth 60. The plunger channels 84, 86 extend through an outer static race 90, which in the embodiment shown in the Figures, is a pocket plate. The outer static race 90 includes a plurality of outer static teeth 92 that prevent rotation between the outer static race 90 and the case 20.

The control actuators 72, 74 are solenoids 94, 96 having plungers 100, 102 that move into and out of the solenoids 94, 96. The action of the plungers 100, 102 will be discussed in greater detail subsequently.

The outer static race 90 includes at least one static race pocket 104. Each of the at least one static race pocket 104 communicates with the each of the plunger channels 84, 86, respectively, allowing a distal end 106, 110 of each plunger 100, 102 to enter therein.

The at least one static race pocket 104 also includes at least one control locking element 112. The control locking element 112 selectively engages the set of control teeth 60 to selectively control whether the control race 42 and wheel hub 12 are rotating, and if so, in which direction the control race 42 and wheel hub 12 are rotating. In the embodiment shown, there is a clockwise control locking element 112 and a counterclockwise control locking element 114. The clockwise control locking element 112 moves from a retracted position within its static race pocket 104 when the plunger 100 of the clockwise control actuator 72 moves to its extended position. When the clockwise control locking element 112 moves into the extended position, it engages with one of the set of control teeth 60 preventing movement of the control race 42 and the wheel hub 12 in the counterclockwise direction. Likewise, the counterclockwise control locking element 114 moves from a retracted position within its static race pocket 104 when the plunger 102 of the counterclockwise control actuator 74 moves to its extended position. When the counter-clockwise control locking element 114 moves into the extended position, it engages with one of the set of control teeth 60 preventing movement of the control race 42 and the wheel hub 12 in the clockwise direction. As discussed above, prevention of rotation in one of the clockwise or counterclockwise directions is a hill hold condition preventing the vehicle from rolling down an incline. Prevention of rotation in both directions (by having both the clockwise 112 and counterclockwise 114 control locking elements engage the set of control teeth 60) is a park condition preventing the vehicle from moving in any direction.

Each of the locking elements 112, 114 may be any type of locking element required to be used based on the design of the races 90, 42. The locking elements 112, 114 could include struts, rockers, pawls, and the like. In the embodiment shown, the locking elements 112, 114 are struts oriented to mirror each other based on the direction of rotation. Each of the struts 112, 114 has a cam surface 116, 120 and an engagement arm 122, 124. The struts 112, 114 are biased into the retracted position by control springs 126, 130.

Control position sensors 132, 134 are in each of the static race pockets 104. The control position sensors 132, 134 sense the position of the clockwise 112 and counter-clockwise 114 control locking elements. This is important as the control locking elements 112, 114 cannot move into engagement with the control race 42 when the control race 42 is moving at speeds greater than a predetermined speed, which is measured by a speed sensor 136 housed within the outer static race 90.

Returning attention to the at least one disconnect locking element 40, there are four disconnect locking elements 40 shown in FIG. 2. The disconnect locking elements 40 are shown to be disconnect rockers 40 having disconnect cam ends 140 and disconnect engagement arms 142 similar to the control locking elements 112, 114 although the profiles of are not identical. Disconnect springs 144 bias the disconnect locking elements 40 into their respective retracted positions within disconnect pockets 146 within the disconnect race 30. The plungers 66 from the disconnect actuators 64 move the disconnect locking elements 40 out of the disconnect pockets 146 and into engagement (a non-disconnect state or connect state) with the control race 42. As stated above, the wheel hub 12 is in neutral when the disconnect locking elements 40 are retracted into the disconnect race 30 such that the control race 42 and wheel hub 12 are disconnected from the driven shaft 18, whereas the wheel hub 12 is engaged and driven when the disconnect locking elements 40 extended and engaging the set of disconnect teeth 56 on the control inner edge 54 of the control race 42.

Seals 150 prevent debris from entering the case 20 lock module assembly 10 and any lubrication from leaving the case 20. These seals 150 are known to those skilled in the art. Bearings 152, 154 are used to facilitate the rotation of disconnect race 30 and the control race 42, respectively.

Figure 3:
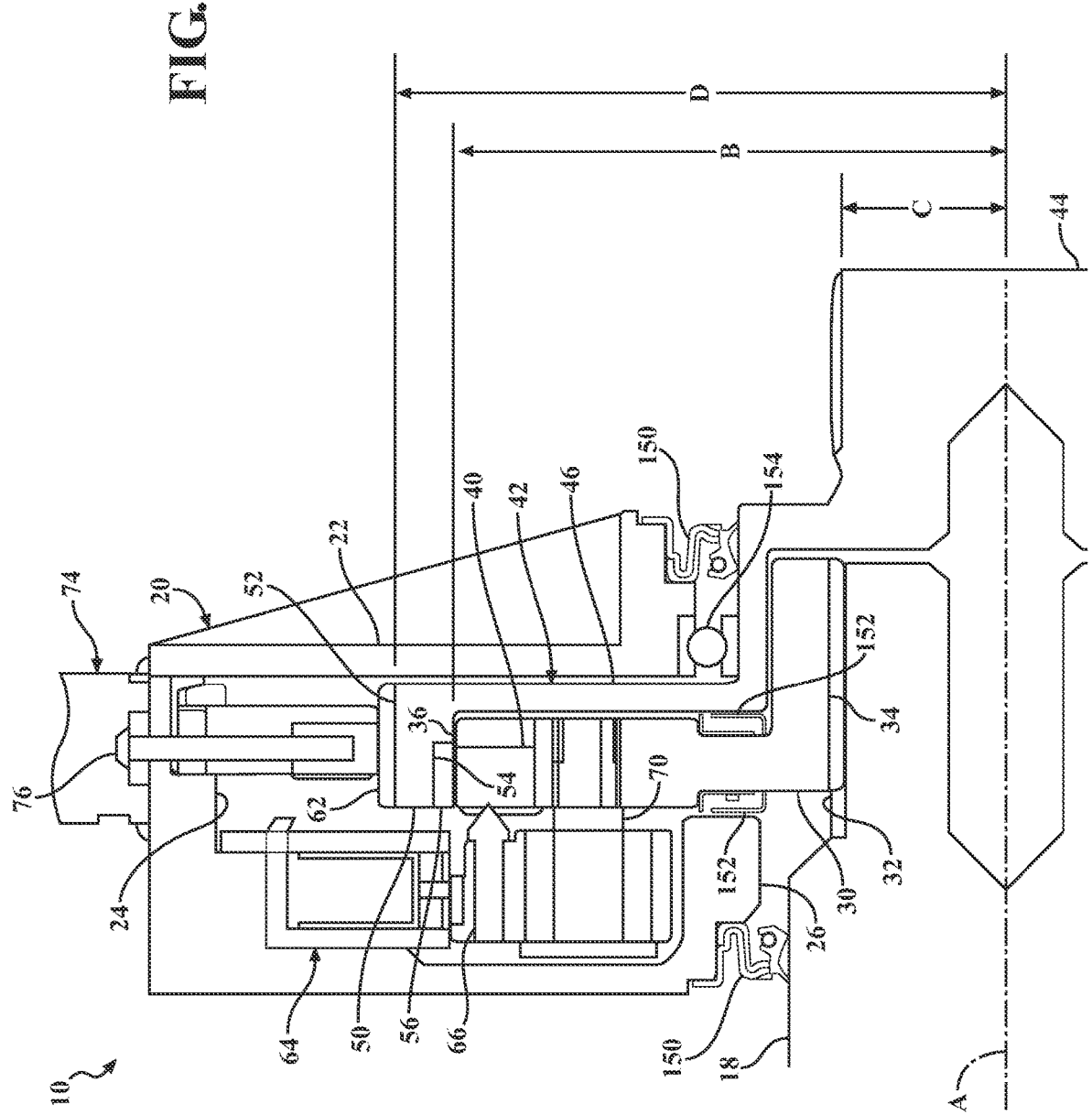
FIG. 3 is a partial cross-sectional side view of FIG. 1 showing an enlarged view of a portion of the lock module assembly.
Figure 4:
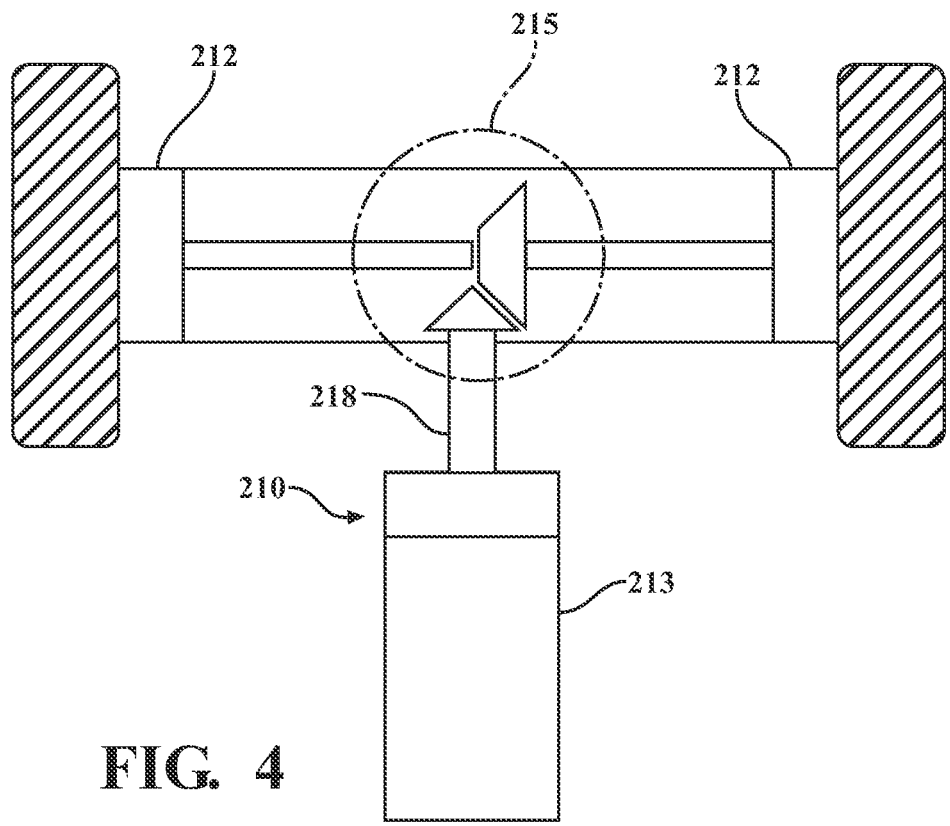
FIG. 4 is a top block diagram view of a first alternative embodiment of the lock module assembly.

Referring to FIG. 4, wherein elements similar to those in the embodiment shown in FIGS. 1 through 3 are offset by 200, a first alternative embodiment of the lock module assembly 210 is shown secured to a transmission 213. The lock module assembly 210 locks two wheel hubs 212 indirectly as the lock module assembly 210 is coaxial with the transmission output shaft 218, acting as the driven shaft. This shaft 218 enters a differential 215, which redirects the rotational forces of the transmission output shaft 218 to both wheel hubs 212.

Figure 5:
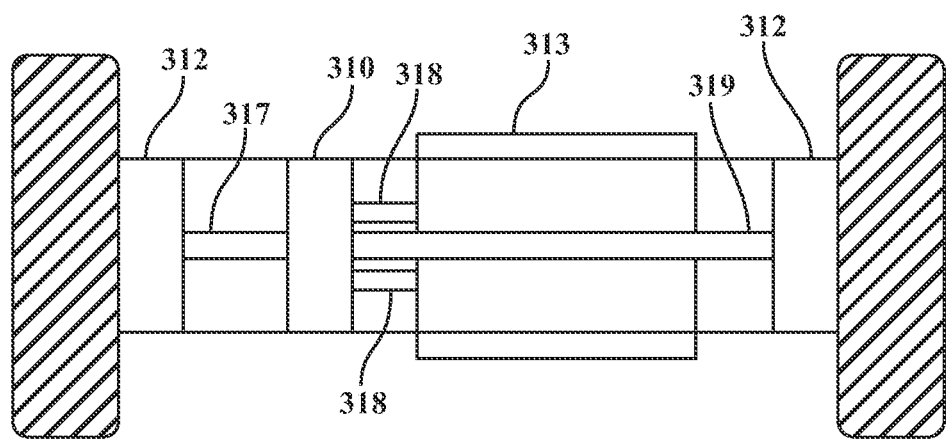
FIG. 5 is a top block diagram view of a second alternative embodiment of the lock module assembly.

Referring to FIG. 5, wherein elements similar to those in the embodiment shown in FIGS. 1 through 3 are offset by 300, a second alternative embodiment of the lock module assembly 310 is shown secured relative to a transmission 313 designed to operate in line with the half shafts 317, 319 that rotate the wheel hubs 312. The driven shaft 318 is hollow allowing at least one of the half shafts 317, 319 to pass therethrough.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A lock module assembly for controlling bidirectional rotations of a wheel hub of a vehicle having a vehicle frame and a rotating shaft to rotate the wheel hub, said lock module assembly comprising:

a case defining an exterior, an interior, and a central axis, said exterior of said case fixedly secured to the vehicle frame such that there is no lost motion between said case and the vehicle frame;

a notch plate rotationally movable within said case, said notch plate defining an outer diameter having a first plurality of notches formed in said notch plate at said outer diameter, said notch plate including a disconnect surface interior of said outer diameter, said disconnect surface having a second plurality of notches formed in said disconnect surface, said notch plate including a control hub extending out of said case and is removably securable to the wheel hub;

at least one clockwise strut spaced adjacent said outer diameter of said notch plate, said at least one clockwise strut pivoting between a retracted position allowing said notch plate to rotate freely and an extended position wherein said at least one clockwise strut abuts against one of said first plurality of notches preventing said notch plate and the rotating shaft from rotating in a counterclockwise direction;

at least one clockwise actuator for pivoting said at least one clockwise strut from said retracted position toward said extended position to selectively extend into one of said plurality of notches to prevent rotation of said notch plate in the counterclockwise direction;

at least one counterclockwise strut spaced adjacent said outer diameter of said notch plate, said at least one counter-clockwise strut pivoting between a retracted position allowing said notch plate to rotate freely and an extended position wherein said at least one counterclockwise strut abuts against one of said first plurality of notches preventing said notch plate and the rotating shaft from rotating in a clockwise direction;

at least one counterclockwise actuator for pivoting said at least one counterclockwise strut from said retracted position toward said extended position to selectively extend into one of said plurality of notches to prevent rotation of said notch plate in the clockwise direction;

a disconnect pocket plate fixedly secured to the rotating shaft, said disconnect pocket plate including at least one disconnect pocket; and at least one disconnect rocker pivotally secured within said at least one disconnect pocket of said disconnect pocket plate, said at least one disconnect rocker spaced adjacent said inner diameter of said notch plate, said at least one disconnect rocker pivoting between a rocker retracted position allowing said notch plate to rotate freely and a rocker extended position wherein said at least one disconnect rocker strut abuts against one of said second plurality of notches preventing said notch plate and the rotating shaft from rotating;

wherein said at least one disconnect rocker operatively disconnects the wheel hub from the rotating shaft to affect a neutral state for the wheel, and said at least one clockwise and said at least one counterclockwise actuators affect a hill hold state in one of the bidirectional rotations, a hill hold state in the other of the bidirectional rotations, and a park state preventing the wheel from rotating in either of the bidirectional rotations.

2. A lock module assembly as set forth in claim 1 including at least one control actuator fixedly secured to said case, said at least one control actuator moving said at least one disconnect rocker between said rocker retracted position and said rocker extended position.

3. A lock module assembly as set forth in claim 2, wherein said at least one control actuator includes a plunger movable between a plunger retracted position and a plunger extended position.

4. A lock module assembly as set forth in claim 3, wherein said plunger moves in a path parallel to said central axis.

5. A lock module assembly as set forth in claim 1 including a speed sensor for measuring speed of said notch plate.

6. A lock module assembly as set forth in claim 5 including at least one clockwise position sensor for identifying whether said at least one clockwise strut is in the retracted position or the extended position.

7. A lock module assembly as set forth in claim 5 including at least one counterclockwise position sensor for identifying whether said at least one counterclockwise strut is in the retracted position or the extended position.

8. A lock module assembly as set forth in claim 1 including a static pocket plate fixedly secured to said case, said static pocket plate including at least one clockwise pocket and at least one counterclockwise pocket, wherein said at least one clockwise pocket houses said at least one clockwise strut and said at least one counterclockwise pocket houses said at least one counterclockwise strut.

9. A lock module assembly as set forth in claim 8, wherein said static pocket plate includes at least one clockwise actuator port in communication with said at least one clockwise pocket and at least one counterclockwise actuator port in communication with said at least one counterclockwise pocket.

10. A lock module assembly as set forth in claim 9, wherein said at least one clockwise actuator extends through said at least one clockwise actuator port and said at least one counterclockwise actuator extends through said at least one counter-clockwise actuator port.

11. A lock module assembly for controlling bidirectional rotations of a wheel hub of a vehicle having a vehicle frame and a rotating shaft to rotate the wheel hub, said lock module assembly comprising:

a disconnect race fixedly secured to the rotating shaft, said disconnect race extending out to a disconnect periphery;

at least one disconnect locking element housed within said disconnect race;

a control race having at least one disconnect tooth selectively engageable with said at least one locking element of said disconnect race, wherein said control race rotates with said disconnect race when said at least one disconnect locking element engages said at least one disconnect tooth, said control race having at least one control tooth in spaced relation to said at least one disconnect tooth;

a disconnect actuator for operatively engaging said at least one locking element to selectively connect and disconnect said control race to and from said disconnect race;

at least one clockwise control actuator for operatively engaging said at least one control tooth on said control race preventing movement of said control race in a counter-clockwise direction; and at least one counterclockwise control actuator for operatively engaging said at least one control tooth on said control race preventing movement of said control race in a clockwise direction;

wherein said at least one disconnect actuator operatively disconnects the wheel hub from the rotating shaft to affect a neutral state for the wheel, and said at least one clockwise and said at least one counterclockwise control actuators affect a hill hold state in one of the bidirectional rotations, a hill hold state in the other of the bidirectional rotations, and a park state preventing the wheel from rotating in either of the bidirectional rotations.

12. A lock module assembly as set forth in claim 11 including a case defining an exterior, an interior, and a central axis, said exterior of said case fixedly secured to a non-rotating portion of the vehicle such that there is no lost motion between said case and the vehicle.

13. A lock module assembly as set forth in claim 12, wherein said at least one clockwise actuator and said at least one counterclockwise actuator are fixedly secured to said case.

14. A lock module assembly as set forth in claim 13, wherein said central axis is coaxial with the rotating shaft of the vehicle.

15. A lock module assembly as set forth in claim 13, wherein said disconnect race is a pocket plate.

16. A lock module assembly as set forth in claim 15, wherein said control race is a notch plate.

17. A lock module assembly as set forth in claim 16 including an outer static pocket plate disposed adjacent said control race.

18. A lock module assembly as set forth in claim 17 including at least one strut housed within said static pocket plate and movable between a retracted position within said static pocket plate and an extended position with a portion of said at least one strut extending out from said static pocket plate.

19. A lock module assembly as set forth in claim 18, wherein said at least one strut is moved by one of said clockwise and counterclockwise actuators.

20. A lock module assembly as set forth in claim 18, wherein said at least one clockwise and counterclockwise actuators are solenoids.

21. A lock module assembly as set forth in claim 11, wherein said disconnect actuator is a linear actuator.

22. A lock module assembly as set forth in claim 11 including at least one clockwise control locking element disposed between said clockwise control actuator and said control race whereby said clockwise control actuator pivots said clockwise control locking element into engagement with said control race.

23. A lock module assembly as set forth in claim 11 including at least one counterclockwise control locking element disposed between said counterclockwise control actuator and said control race whereby said counterclockwise control actuator pivots said counterclockwise control locking element into engagement with said control race.

* * * * *